United States Patent [19]

Lemere

[11] Patent Number: 5,644,442
[45] Date of Patent: Jul. 1, 1997

[54] SPHERICAL REAR VIEW MIRROR TARGET MARKING SYSTEM AND METHOD

[76] Inventor: Peter N. Lemere, 48 Center Road Cir., Orange, Conn. 06477

[21] Appl. No.: 267,866

[22] Filed: Jun. 28, 1994

[51] Int. Cl.$^6$ ..................................................... G02B 5/08
[52] U.S. Cl. .......................... 359/838; 359/850; 359/866; 359/900; 356/21
[58] Field of Search .................................. 359/439, 838, 359/850, 855, 864, 865, 866, 868, 884, 900; 356/21; 33/264

[56] References Cited

U.S. PATENT DOCUMENTS

| | | | |
|---|---|---|---|
| 1,311,253 | 7/1919 | Stern . | |
| 1,879,592 | 9/1932 | Thomas . | |
| 2,460,406 | 2/1949 | Alexander | 88/73 |
| 2,871,754 | 2/1959 | Marble | 88/2.2 |
| 2,881,655 | 4/1959 | Eisenschink | 359/884 |
| 3,772,795 | 11/1973 | Calvet | 33/264 |
| 4,023,029 | 5/1977 | Fischer | 240/4.2 |
| 4,182,552 | 1/1980 | Feinbloom | 350/303 |
| 4,482,210 | 11/1984 | Brookman | 359/872 |
| 4,678,294 | 7/1987 | Van Nostrand | 359/864 |
| 4,834,521 | 5/1989 | Dubs | 350/631 |
| 4,917,485 | 4/1990 | Baldwin, Sr. | 359/864 |
| 5,321,556 | 6/1994 | Joe | 359/863 |
| 5,418,610 | 5/1995 | Fischer | 359/838 |

FOREIGN PATENT DOCUMENTS

| | | | |
|---|---|---|---|
| 58105105 | 6/1983 | Japan | 359/838 |
| WO/8000680 | 4/1980 | WIPO | 359/838 |

Primary Examiner—Timothy P. Callahan
Assistant Examiner—Terry L. Englund
Attorney, Agent, or Firm—Charles Blaich

[57] ABSTRACT

A system to overcome the visual aberration of spherical automotive rear view mirrors, related to the distance between vehicles, requires no measurement or mathematical skills. The system includes means for visually determining the curvature of a mirror, and templates for the proper placement of etched film strips which frame a safe return target area on the mirror. This target area is an indicator of when a vehicle seen in the mirror is at a safe distance behind the vehicle with the marked mirror.

5 Claims, 14 Drawing Sheets

SPHERICAL REAR VIEW MIRROR TARGET MARKING SYSTEM AND METHOD

BACKGROUND OF THE INVENTION

Convex spherically curved passenger rear view side mirrors have become common equipment on passenger vehicles. These mirrors have the advantage in providing a wide field of view for the driver. Unfortunately, the spherical radii for such mirrors are not standard, varying from auto maker to auto maker and even from brand to brand and style to style. The varying spherical radii can be confusing to the driver because of the varying field of view and more importantly the apparent distance of the image also varies. Auto makers uniformly have imprinted such spherical mirrors with a warning "OBJECTS IN MIRROR ARE CLOSER THAN THEY APPEAR". This factor has confused the driver causing accidents because the passing driver will pull in front of the passed vehicle prior to clearing the vehicle.

OBJECT OF THE INVENTION

It is the primary object of the invention to provide means to apply target lines to such spherical mirrors to act as a guide to establish when the passing vehicle has safely pulled ahead of the passed vehicle thus imparting accurate distance perception to the driver.

It is another object of the invention to supply a system and method to locate target guide lines on spherical mirrors and permanently marking the spherical mirror with such target guide lines.

It is yet another object of the invention to supply a system and method which permits the average person with little or no mathematical acumen and no measuring skills to locate target guide lines on spherical mirrors.

It is another object of the invention to supply such components which do not require the user to have measuring skills.

PRIOR ART

Rearview mirror indicating lines which act to frame a passed vehicle when the passing vehicle has progressed a safe distance in front of the passed vehicle to safely permit the passing vehicle to return to position in front of the passed vehicle has long been known. Specifically the following patents were found in a preliminary search for patentability:

| Patent No. | Applicant | Issued |
| --- | --- | --- |
| 1,311,253 | Stern | July 29, 1919 |
| 1,347,593 | Rugh | July 27, 1920 |
| 1,879,592 | Thomas | September 27, 1932 |
| 2,460,406 | Alexander | February 1, 1949 |
| 2,871,754 | Marble | February 3, 1959 |
| 4,023,029 | Fisher | May 10, 1977 |
| 4,182,552 | Feinbloom | January 8, 1980 |
| 4,834,521 | Dubs | May 30, 1989 |

Although all of the prior art deals with indicating or targeting means, with the exception of Dubs, to permit safe vehicular passing, none reflect on the means of installing such indicators while the mirror is on a vehicle nor the fact that the installer requires little or no skill in the art nor does the prior art teach the accommodation of spacing to reflect all possible spherical radii.

SUMMARY OF THE INVENTION

The installation of vertical stripes properly set apart to act as a guide for the distance of a vehicle behind the passing vehicle requires a means to determine the curvature of a given mirror. In one form this is accomplished by comparing multiple rigid plastic coded rectangular plates each of which have one edge formed to accommodate a given mirror's curvature. These coded rectangular plates are placed on a mirror in sequence until one is found that conforms to the curvature of the mirror. The plate coding conforms to varying dimensioned similarly coded spacing templates. The proper template is temporarily fastened to the mirror. Finally, translucent strips are adhered to the mirror accordingly on either side of the spacing template. The spacing template is then removed leaving two correctly set apart vertical translucent lines on the mirror. When passing a vehicle the driver can safely pull in front of the passed vehicle when the reflection of the passed vehicle is between the vertical lines.

BRIEF DESCRIPTION OF THE DRAWINGS

FIG. 1 A, B, C, D, E and F depicts the reflection of a vehicle being passed in a side rear view spherical mirror.

FIG. 2 A, B, C, D, E and F illustrates the varying curvatures of the rectangular color coded plastic plates used to determine a mirror's curvature.

DETAILED DESCRIPTION

FIG. 1 A, B, C, D, E and F illustrate the aberration that occurs in the use of spherical side mounted rear view mirrors in passing a second vehicle. In FIG. 1A the enhanced viewing area provided by the spherical mirror 20 the passing vehicle has not cleared the vehicle it is passing because the reflected vehicle extends beyond the installed vertical strips 3 even though there is a full view of the vehicle. FIGS. 1 B and 1 C illustrate the progression of views corresponding to the view in the mirror of the passing vehicle as it completes the passing maneuver. In FIG. 1D the passed vehicle's reflection is barely clear of the vertical lines of the target area indicating that the passing vehicle may safely return to the driving lane. FIGS. 1E and 1F illustrate the continued progression of the passing vehicle in front of the passed vehicle.

Figure 1A:
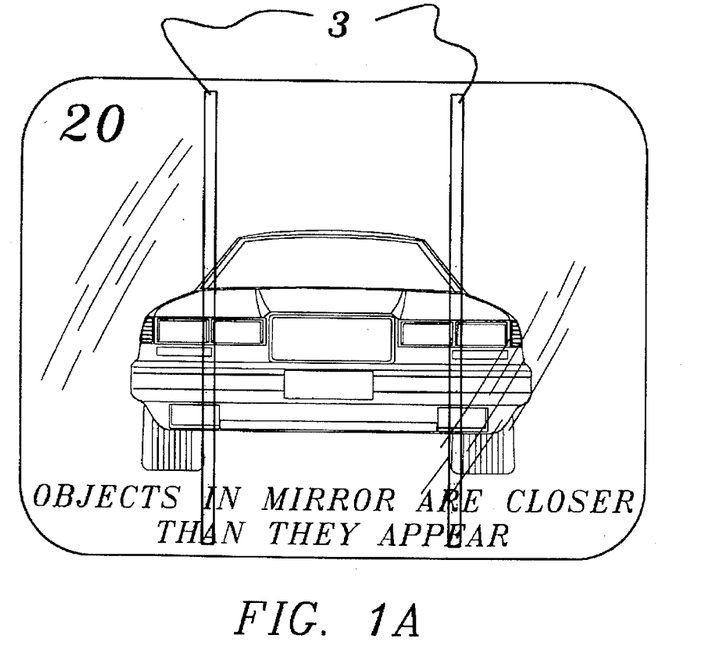
Figure 1B:
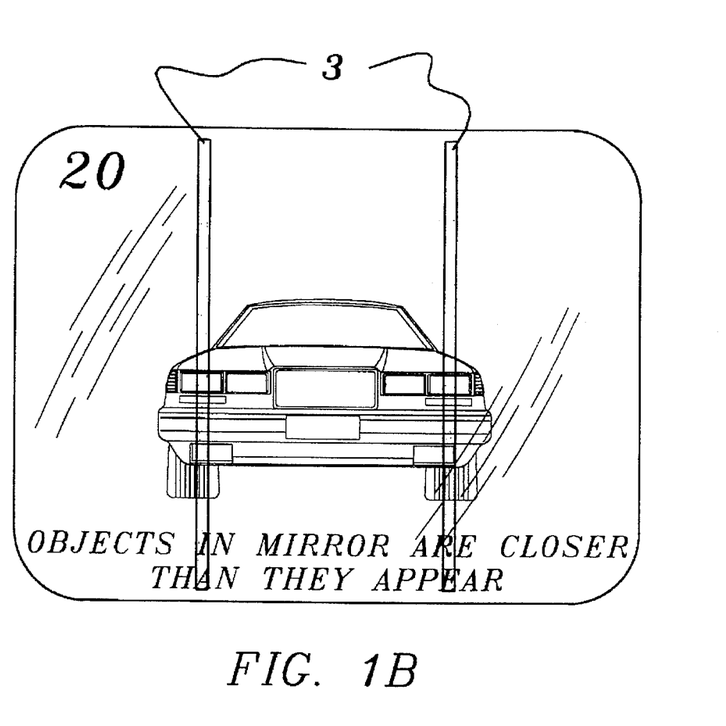
Figure 1C:
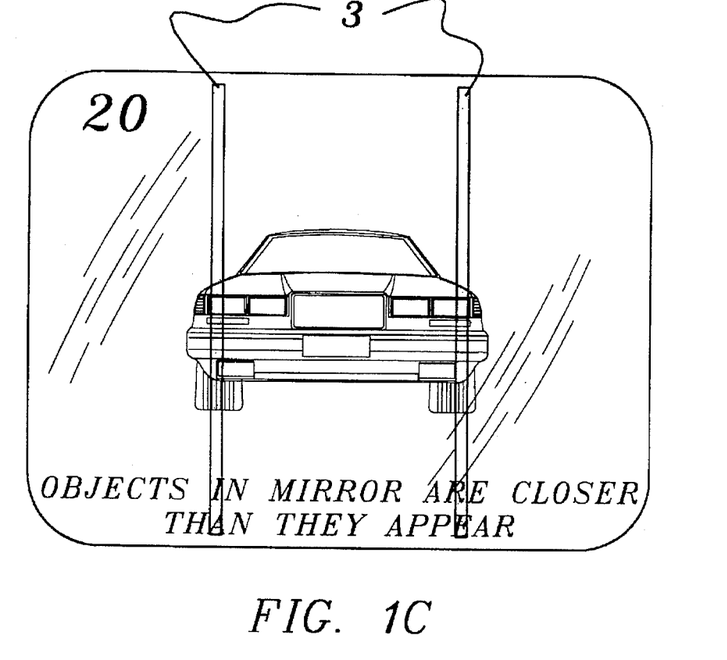
Figure 1D:
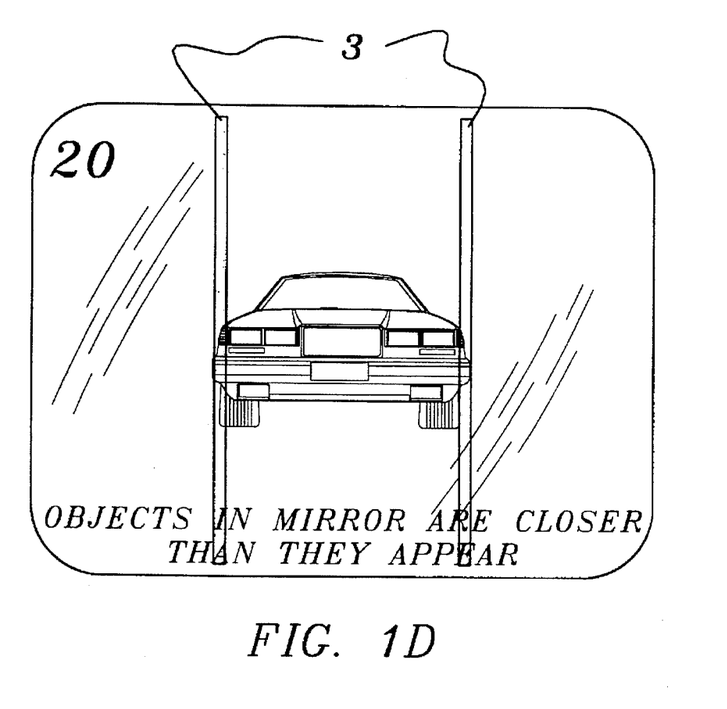
Figure 1E:
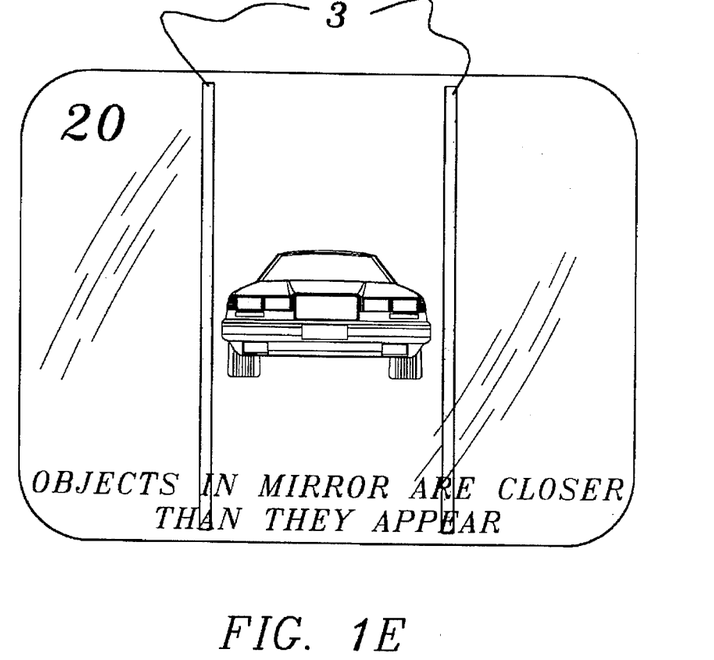
Figure 1F:
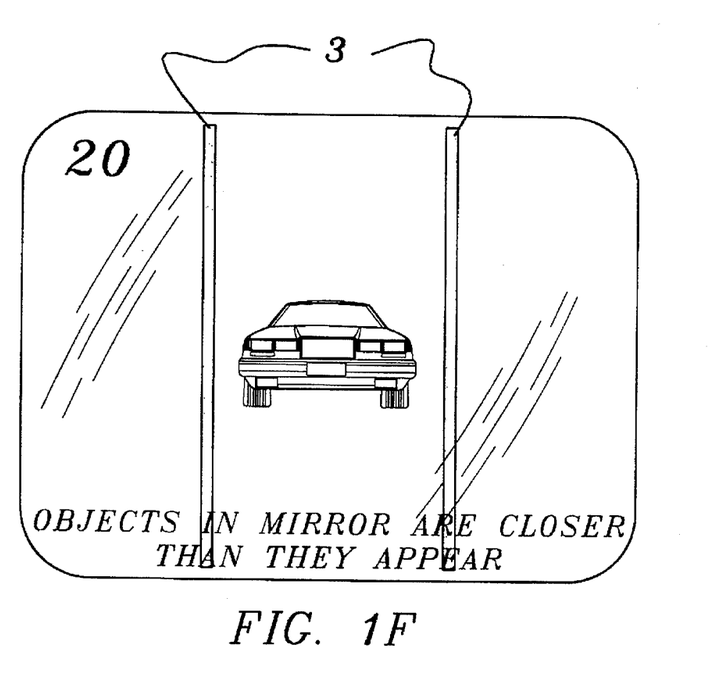
Figure 2A:
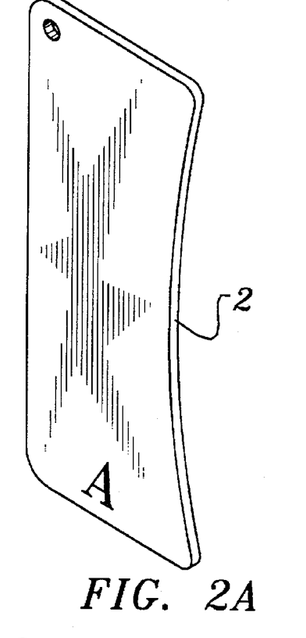
Figure 2B:
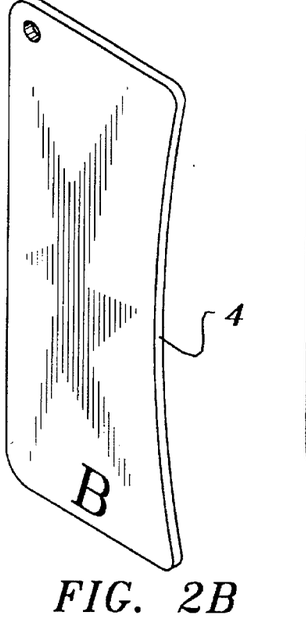
Figure 2C:
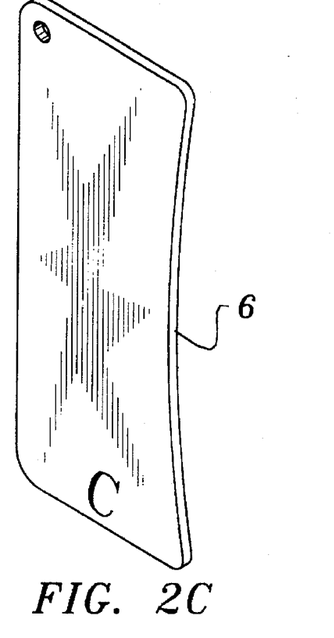
Figure 2D:
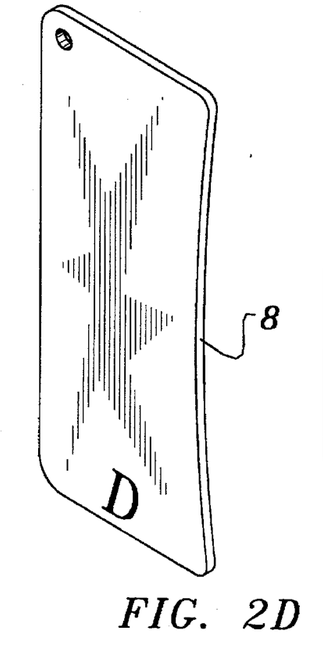
Figure 2E:
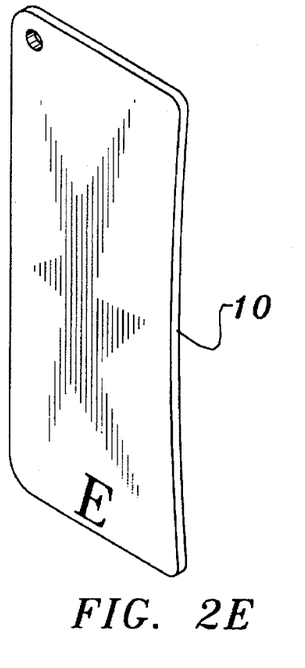
Figure 2F:
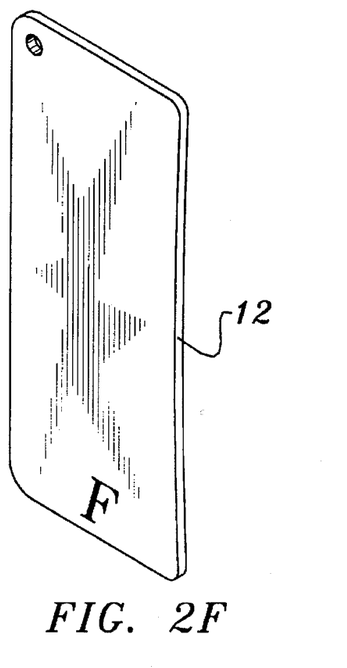
Figure 3:
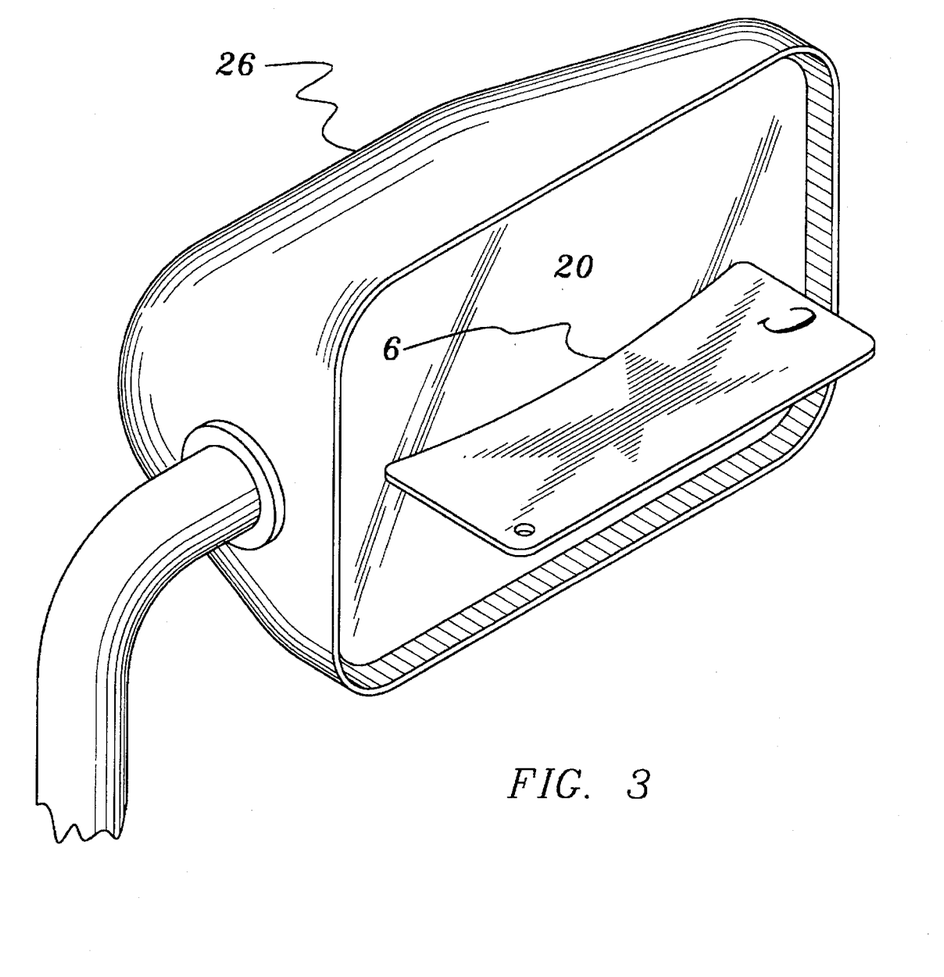
FIG. 3 illustrates a plastic plate which conforms to the curvature of a spherical rear view mirror.

As stated earlier in the Summary of the Invention, the correct location of the vertical strips 3 forming the target area is determined by comparison with known curvature coded plastic plates of side mounted spherical rear view mirror. In simplest manner this is accomplished by comparison of rigid rectangular plates FIG. 2 A, B, C, D, E and F each of which have one edge 2, 4, 6, 8, 10 and 12 respectively which has been formed to correspond to the curvature of common spherical mirrors (the curvatures have been exaggerated to best illustrate this point). The curved edge of each rectangular plate is applied to and held onto curved mirror 20, as shown in FIG. 3, until the curvature 6 of one plate is found to conform to the curvature of the spherical mirror 20 in housing 26. The plates identification C conforms to a template 30 shown in FIG. 4 identified by the same letter C whose width corresponds to the width needed for separation of the vertical target strips. The perforations 32 permit contact of the mirror 20 shown in FIG. 5 with common masking tape 38 to adhere template 30 to mirror 20.

Figure 12:
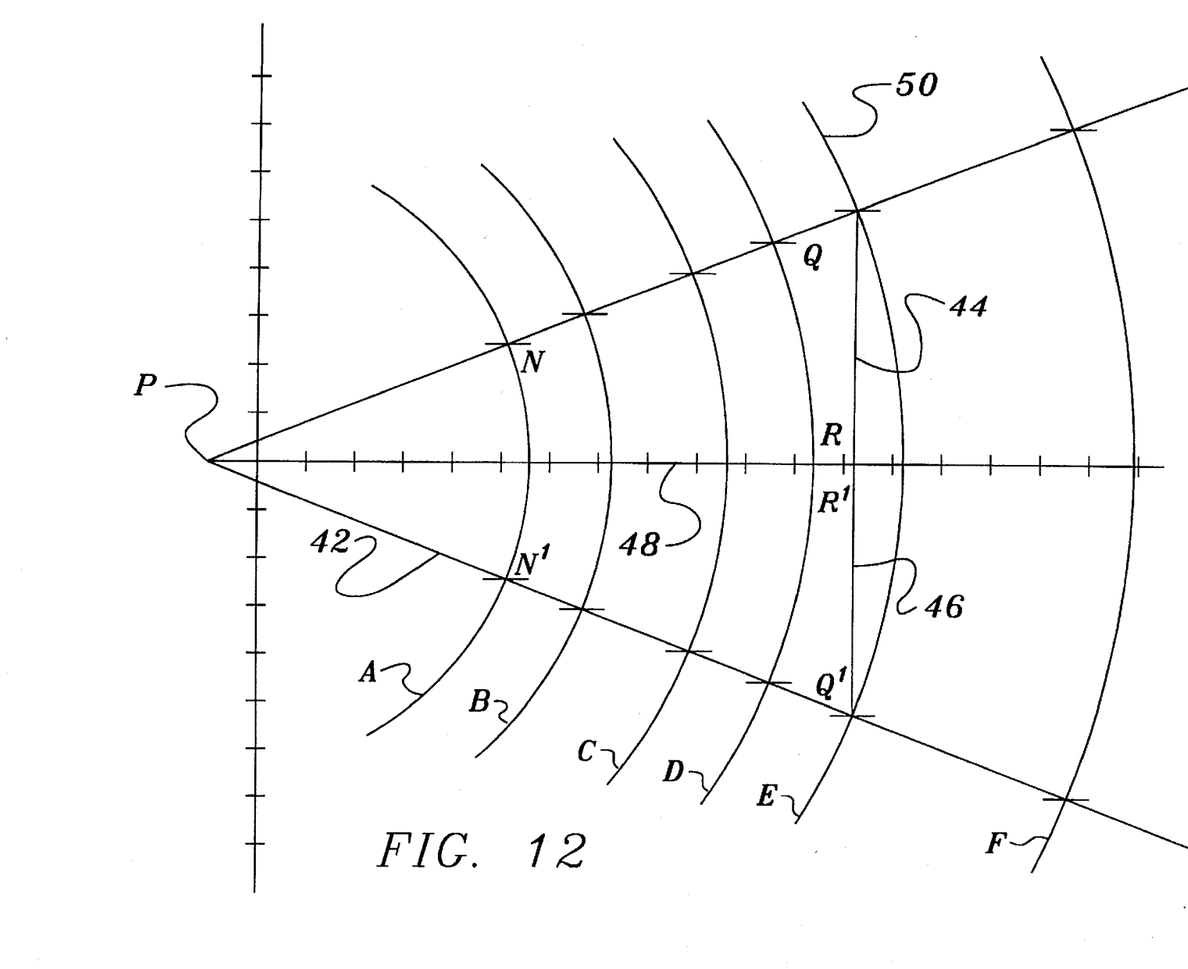
FIG. 12 is a diagram illustrating determination of width of spacing template.

The widths of translucent strip separation templates (only one shown) are determined by triangulation as shown in FIG. 12 wherein a number of varying spherical (shown in two dimension) radii which conform to the commonly used radii for automotive side mounted rear view mirrors are shown. Intersects 40 and 42 and angles Q and Q' are determined geometrically by assuming that lines 40 and 42 are hypotini of right triangles P Q R and P Q' R' wherein bases 44 and 46 are line segments formed by segmenting the arc formed by the surface of spherical mirror 20 and lines 40, 42 and 48 are radii of spherical mirror 20. Since the length of lines 40, 42 and 48 are known or can readily be calculated, the length of line segment 44 and 46 are easily calculated. Lines 44 and 46 cumulatively equaling the width of spacing template. By a process of iteration the spherical radii can easily be calculated from measured displacement. The arcs shown in FIG. 12 are exaggerated to better illustrate the concept. Actual values for commonly used spherical automotive mirrors are:

| Rectangular Plates Identification | Width of Template cm | Spherical Radii cm |
| --- | --- | --- |
| A | 4.70 | 79.90 |
| B | 5.40 | 100.46 |
| C | 6.26 | 125.30 |
| D | 6.73 | 139.01 |
| E | 7.24 | 153.77 |
| F | 8.81 | 199.39 |

The length of spacing templates are designed to be trimmed to the length of the automotive side view mirror.

Figures 4, 6:
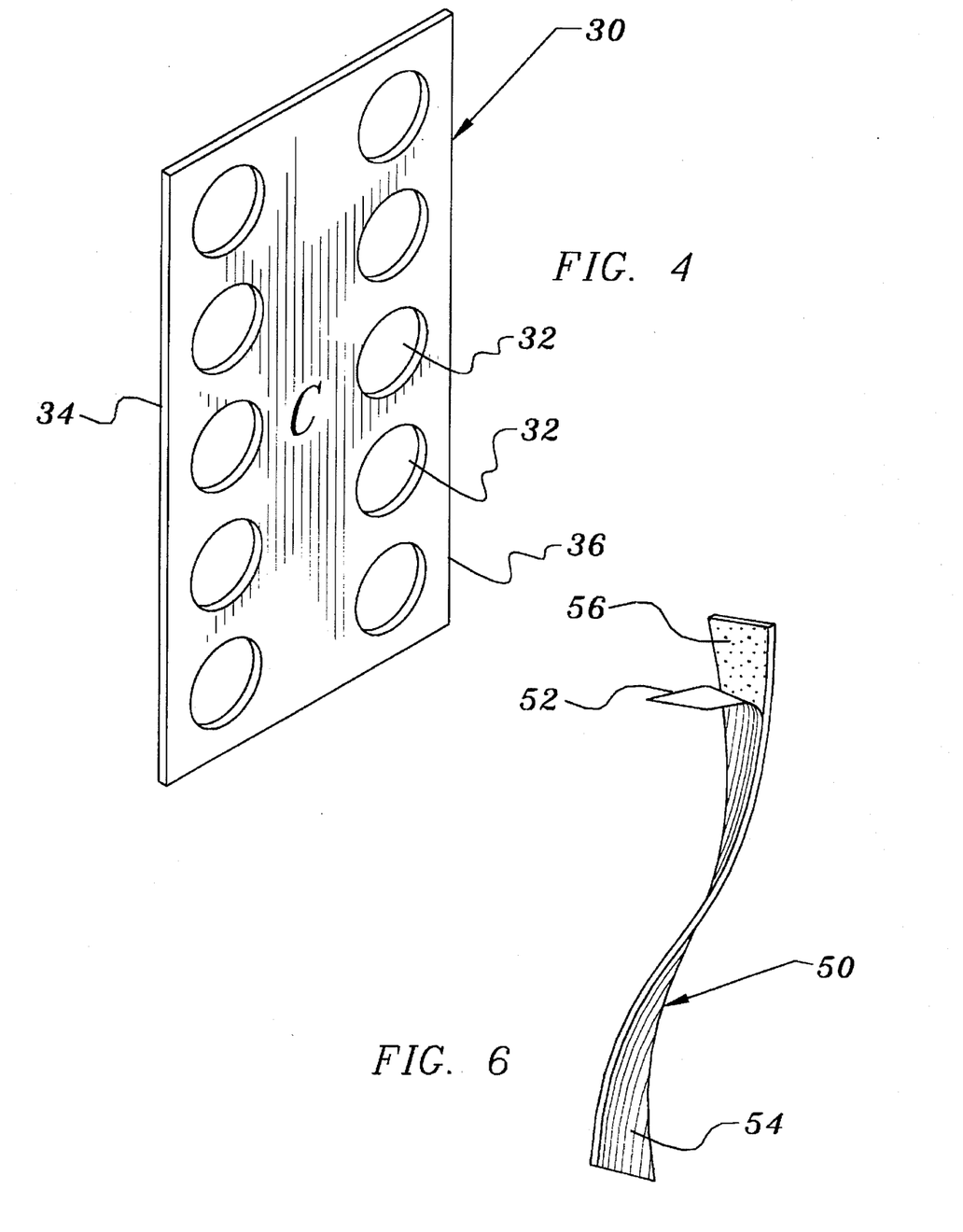
FIG. 4 illustrates a spacing template.
FIG. 6 illustrates the translucent strip.
Figure 5:
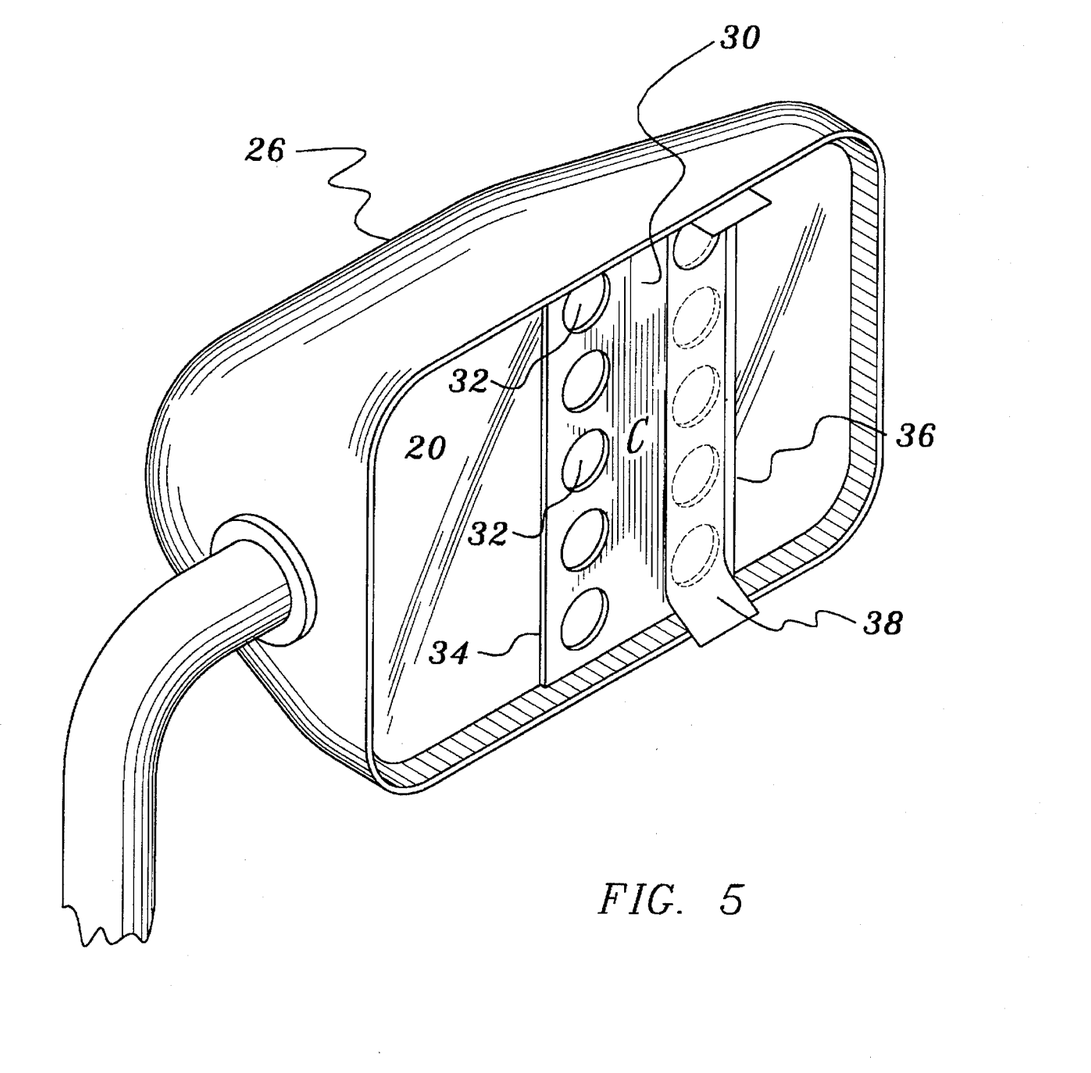
FIG. 5 illustrates a spacing template temporarily fastened to the rear view mirror.

When the appropriate template is adhered to the curved automotive mirror, pressure sensitive frosted crystal film is adhered to the spherical mirror 20 conforming to the left and right edges 34 and 36 respectively FIGS. 4 and 5. Pressure sensitive frosted crystal film is supplied as a composite 50 as shown in FIG. 6 made up of release paper backing 52, film 54 and adhesive layer 56.

Figure 7:
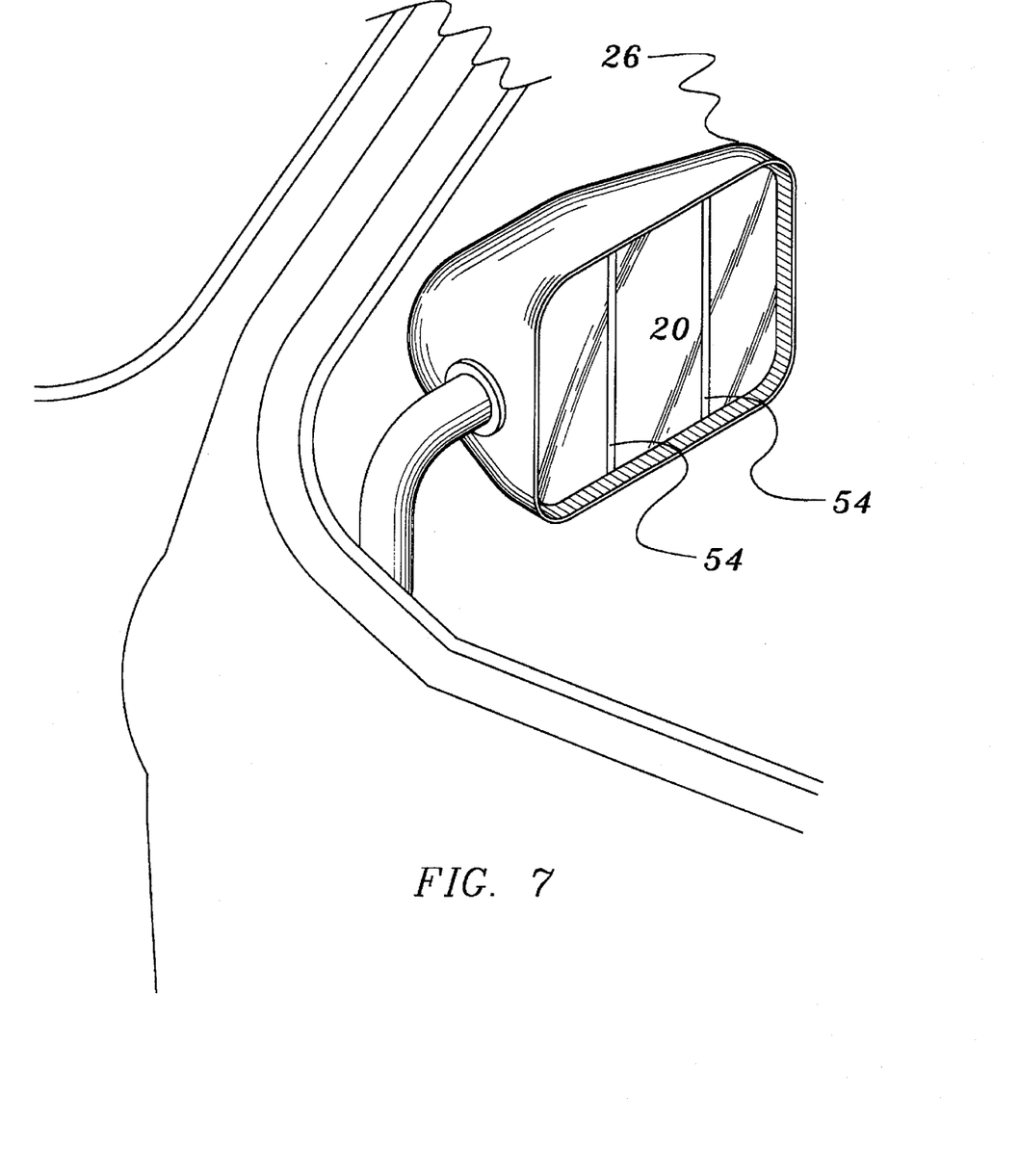
FIG. 7 illustrates two translucent strips in place on a spherical rear view mirror.

When adhered to spherical mirror 20 as shown in FIG. 7 the film gives the appearance of broad lines 54 etched into the surface of the mirror thus acting to outline a target area wherein when a passed vehicle is framed by the vertical lines it is safe for the passing vehicle to return to the lane in front of the passed vehicle.

Figure 8:
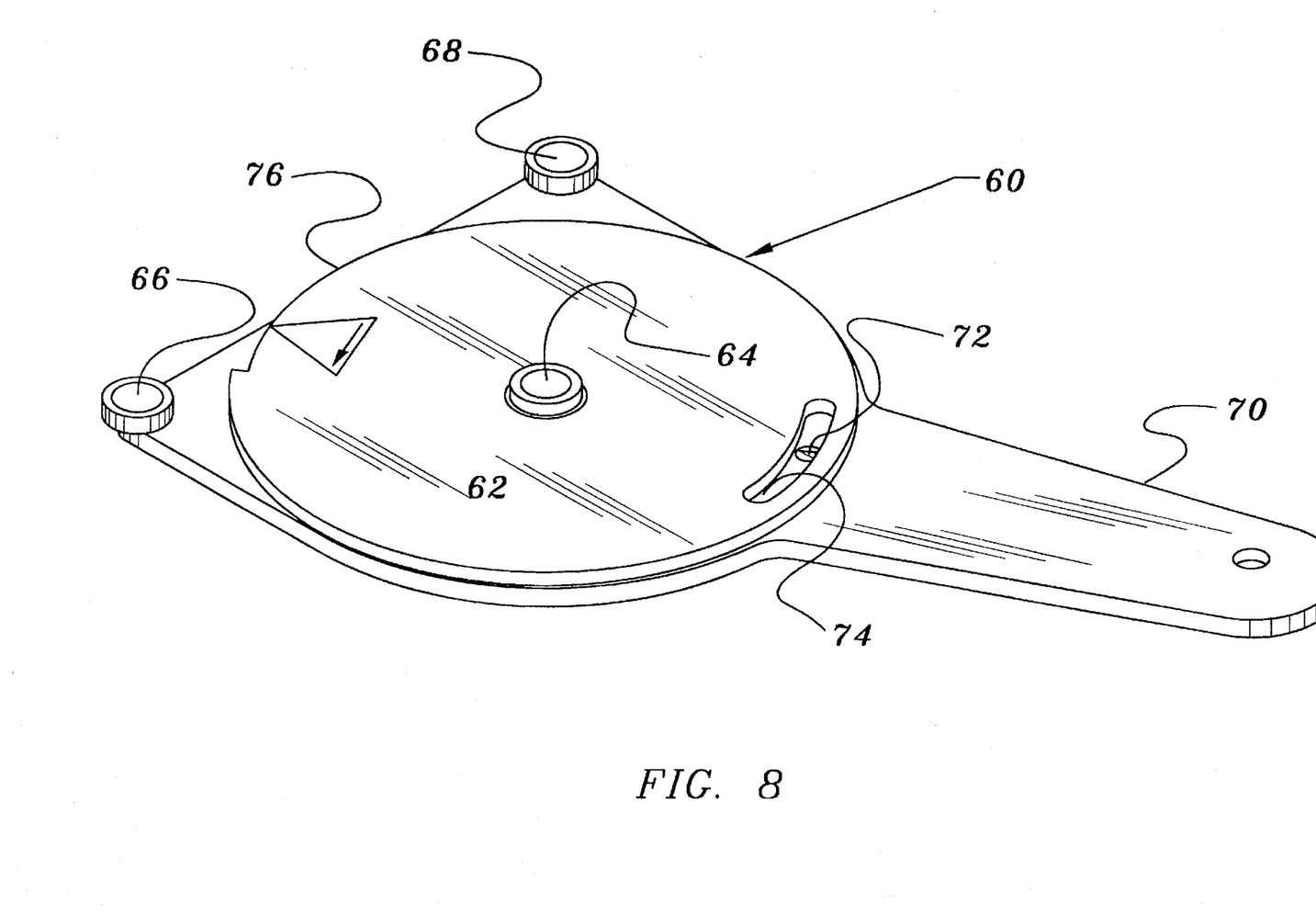
FIG. 8 illustrates an alternate plastic cam mirror curvature measuring device.
Figure 9:
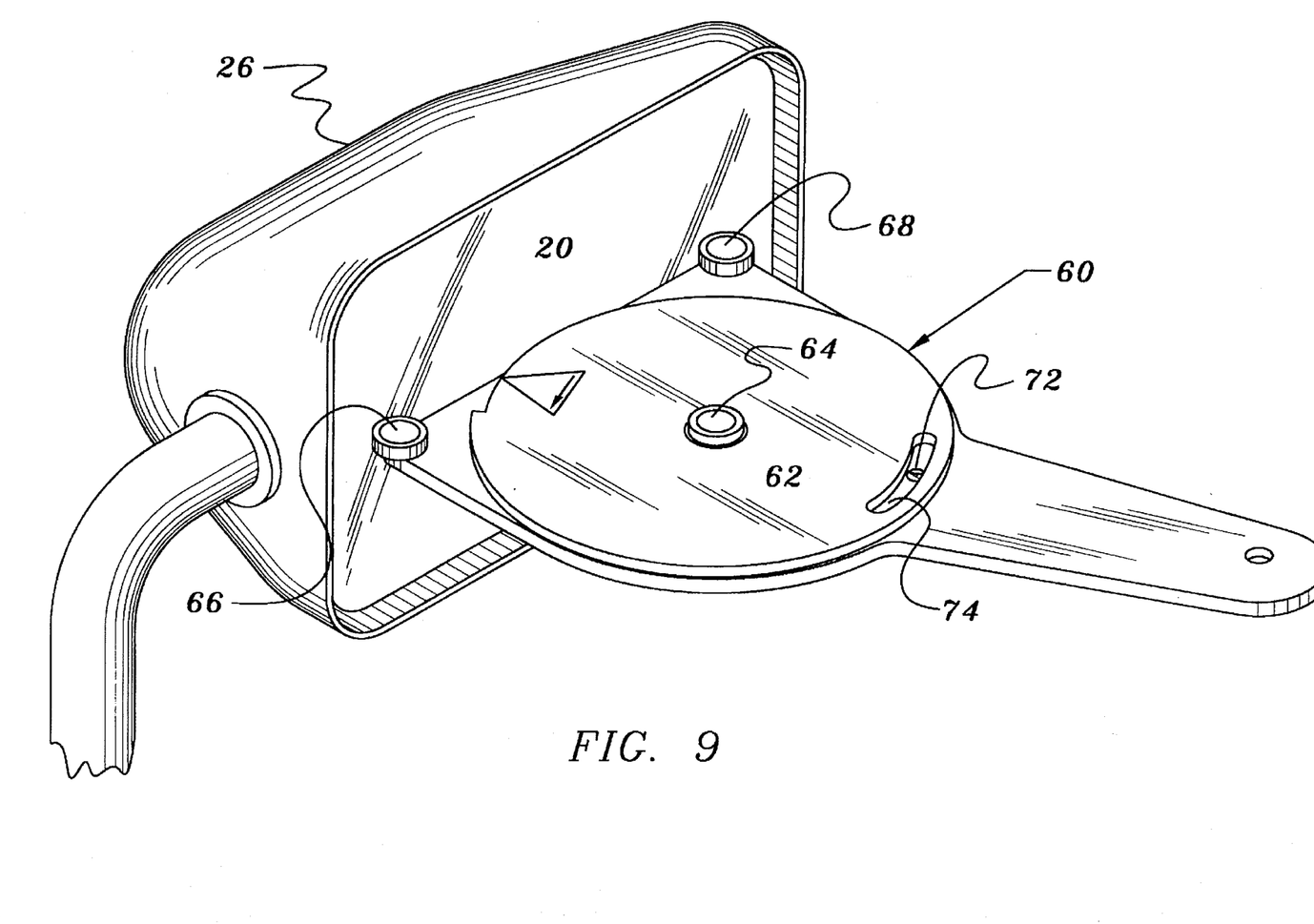
FIG. 9 illustrates the alternate plastic cam measuring device in place on a spherical mirror indicating the proper code for selecting the correct spacing template.

An alternate means of determining the curvature of an exterior automotive rear view mirror is depicted in FIGS. 8 and 9 which illustrates a cam gauge 60 which is made up of rotating cam 62 mounted on pivot pin 64. Left and right hand mirror round metal contacts 66 and 68 and handle 70 which is part of base. The upper surface of the handle/base has 6 identifying marks 72 on its circumference. The eccentric cam 62 has a slot 74 located near its periphery in line with the identifying marks on or near the circumference of the handle/base. In practice the cam gauge is pressed against spherical mirror 20 being supported by round metal contacts 66 and 68 which are affixed to base handle, cam 62 is rotated counterclockwise until cam edge contacts mirror surface 20. The user then reads the identifier located on base/handle which appears in slot 74. The identifier corresponds to those previously defined above to select the appropriate spacer template.

An alternate method of application of correctly spaced vertical lines on the spherical mirror is the applique of correctly spaced lines as previously discussed which utilize spacer templates to establish the correct distance between vertical lines depending upon the curvature or radius of the spherical rear view mirror. Such adaptation can easily be accomplished by preparing a applique 160, FIG. 13 which has a center line 162, left and right hand frosted vertical stripes 164 and 166 and indicator lines A, B, C, D and E.

Figure 13:
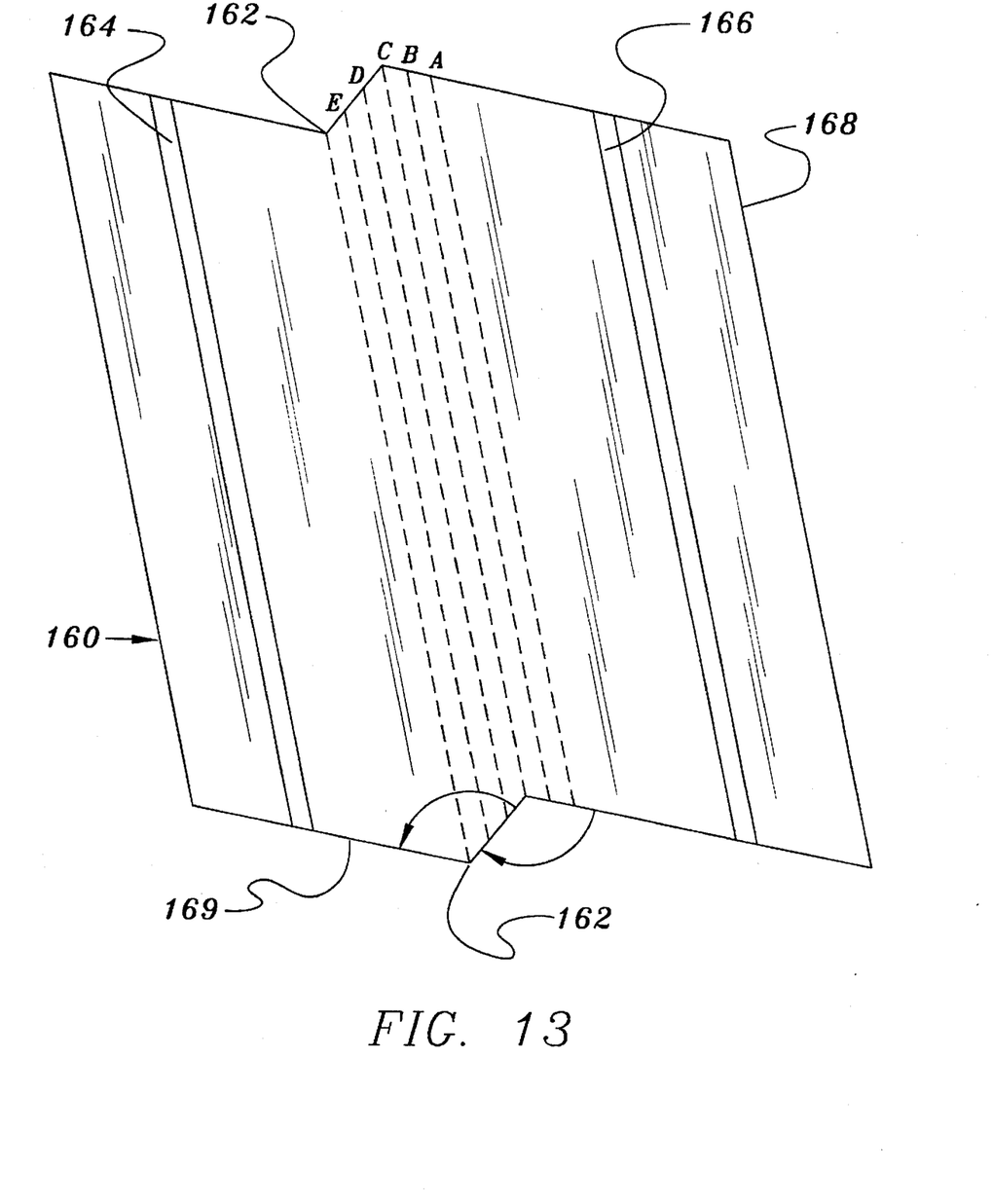
FIG. 13 illustrates fold over applique spacer.

As in the selection of spacer templates the curvature of the mirror is determined by rectangular comparison plates. Assuming that the comparison designates C or intermediate width applique 160 as shown in FIG. 13 is folded on itself on, for example, line C. When this is accomplished applique is again folded to form a crease on centerline 162 and again folded in such a manner that lines A and B, of the upper portion 168 of applique 160 shown in FIG 13, are folded over lines D and E on the lower applique portion 169. The thus folded applique now correctly spaces frosted lines 64 and 66 wherein they can be adhered to a spherical mirror.

Figure 10:
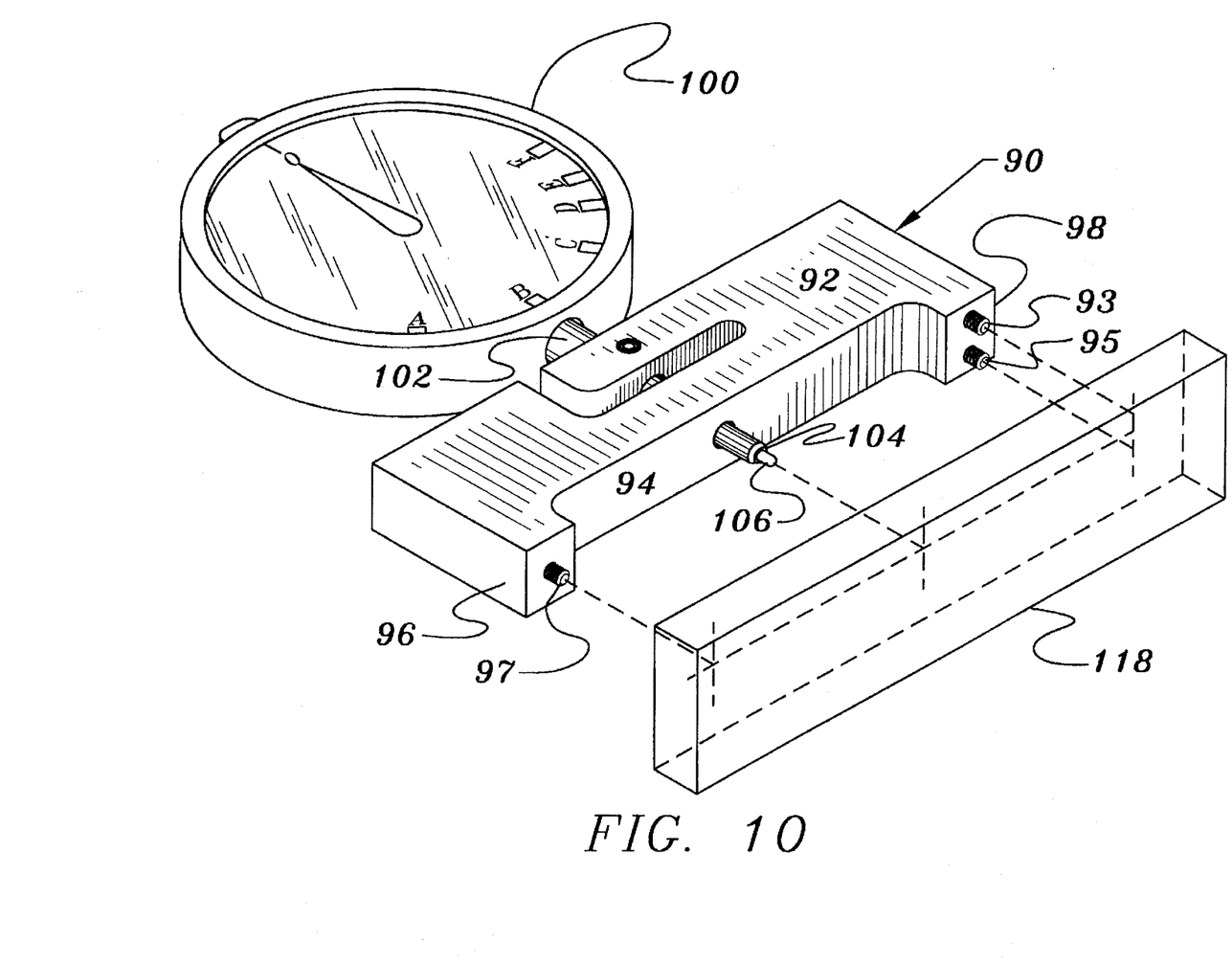
FIG. 10 illustrates another alternative curved mirror measuring device.
Figure 11:
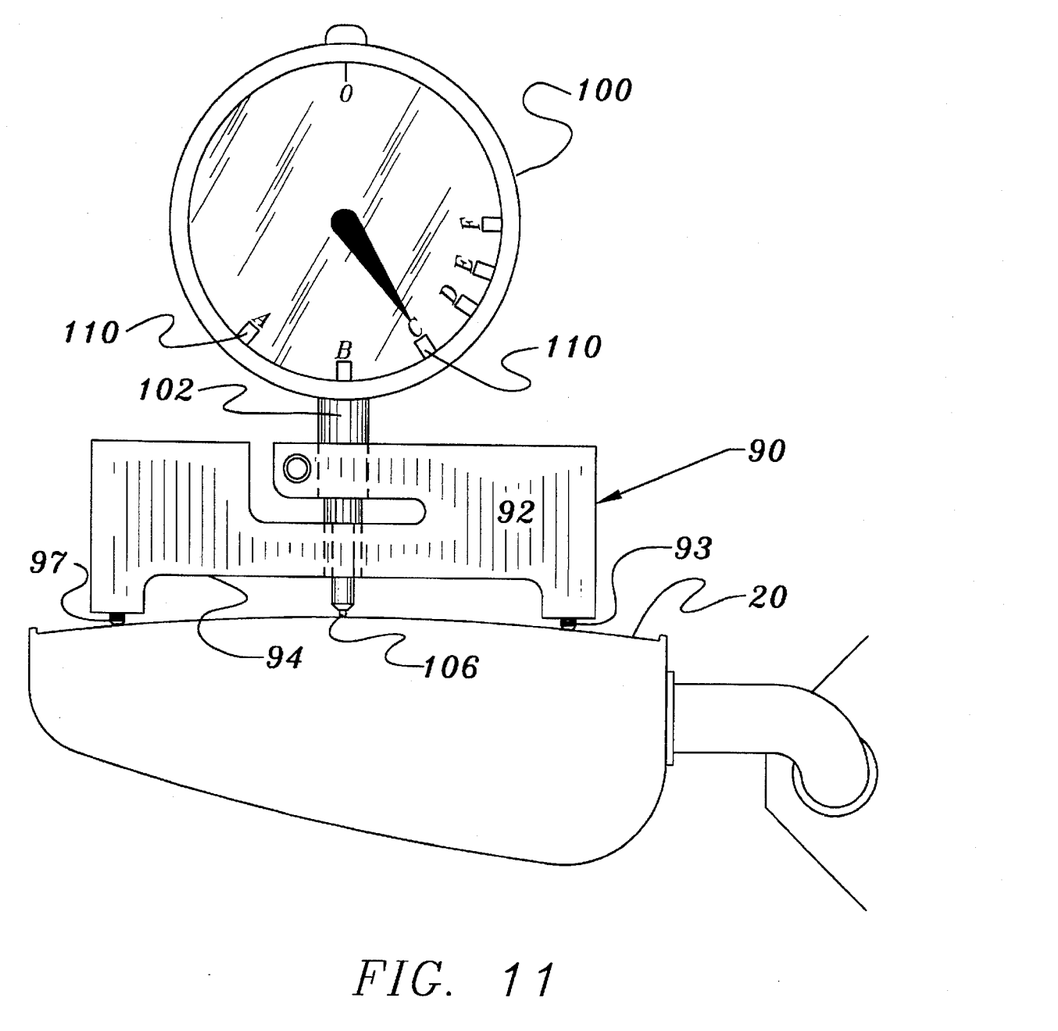
FIG. 11 illustrates another mirror curvature measuring device on the mirror indicating the code for selecting the appropriate spacing template.

In its original form the displacement gauge 90 as shown on FIGS. 10 and 11 used to measure the curvature of the spherical mirror 20 as shown in FIG. 11 is made up of a spanning block 92 lower surface 94 has been machined to provide an area into which the spherical mirror's curvature can be accommodated. This in effect results in left and right contact legs 96 and 98 respectively. Each of the contact legs has mounted therein captured ball contacts, i.e. 97 in left contact leg 96 and 93 and 95 in right contact leg 98. In the center of spanning block mounting means is provided for the insertion and passing through of arc indicator gauge which has an indicator dial 100, shaft 102 and contact foot 104 which has a captured ball 106 contact mounted therein. Gauge assembly is "zeroed in" on a planer block 110. It is then applied to spherical mirror 20 and the radii measured by displacement. As mentioned earlier, such calculation requires trigonometric acumen on the part of the user and is the basis for the other measuring means herein disclosed. This ability to simply translate the degree of displacement is shown in FIG. 11 wherein markings or identifying means 110 are added to the dial indicator face. These are shown in ranges covering several indicator increments because it has been emperically determined that the subject mirrors curvature are not constant. These identifiers correspond to those previously disclosed.

The foregoing details are exemplary only and are not illustrative of the principles of this invention and are not to be interpreted to limit the scope of the invention.

What is claimed is:

1. A method of marking a spherical automotive rear view mirror with a safe to return target area comprising the steps of determining the curvature of said mirror by conforming a coded mirror comparitor to the curvature of said mirror, selecting a coded spacer template whose code corresponds to said coded mirror curvature comparitor, temporarily fastening said spacer template to said mirror with masking tape, adhering frosted crystal film on said mirror in vertical relationship at the left and right edges of said template and then removing said template, said adhered films on said mirror forming a safe to return target to overcome the visual aberrations common to said spherical automotive rear view mirror.

2. A system for forming a safe return target area on a spherical automotive rear view side mirror comprising comparison means to determine the curvature of said spherical mirror, said comparison means having located thereon coded identifiers corresponding to said curvature of said mirror referring to a selected spacer template having the same coded identifier located thereon, said template having left and right edges and a center portion; said center portion having perforations therethrough, said perforations acting to supply an area for the temporary adhering of said selected template to said mirror wherein the selected template is one of said spacer templates which has the same coded identifier as the comparison means corresponding to said mirror's curvature, said left and right edges of said selected template acting to define the location of vertical frosted left and right film strips, said left and right film strips being adhered to said spherical mirror at said left and right selected template edges, respectively, said temporarily adhered selected template being removed, said area between said adhered vertical frosted film strips defining said safe return target area.

3. A system for forming a safe return target area according to claim 2 wherein said comparison means is a number of coded rectangular rigid plastic plates, each of said plates having a different curved edge, one of said plates having its respective curved edge conforming to the curvature of said spherical automotive rearview side mirror, said code on one of said rectangular rigid plastic plates acts to identify said selected template with said same coded identifier located thereon.

4. A system for forming a safe return target area according to claim 2 wherein said comparison means is a cam gauge which includes a rotating cam, left and right spherical mirror contacting points and a base, said rotating cam being pivotally mounted on said base between said spherical mirror contacting points, said rotating cam having a curved peripherally located slot, said slot being in alignment with coded identifiers located circumferentially on said base; said cam gauge contacting said spherical mirror on said left and said right contacting points, said pivotally mounted rotating cam being rotated until said rotating cam contacts said spherical mirror, said slot in said rotating cam aligning with one of said coded identifiers acting to identify said selected template.

5. A system for forming a safe return target area according to claim 2 wherein each of said frosted vertical film strips comprises a composite, said composite having a release paper backing, a frosted crystal film layer and an adhesive layer, said frosted crystal film and adhesive layer being applied to said spherical automotive mirror, said thus applied frosted crystal film and adhesive layer having the appearance of being etched into said spherical mirror's surface.

* * * * *